(12) United States Patent
Chen et al.

(10) Patent No.: US 11,457,717 B2
(45) Date of Patent: Oct. 4, 2022

(54) MAKEUP FLUID MANAGEMENT AND SUPPLY DEVICE AND METHOD

(71) Applicant: GloryMakeup Inc., Taipei (TW)

(72) Inventors: Wen Hsing Chen, Taipei (TW); Alexander Ong Sy, Taipei (TW); Christie Chien, Taipei (TW); Charlene Hsueh-Ling Wong, Taipei (TW)

(73) Assignee: GloryMakeup Inc., Taipei (TW)

( * ) Notice: Subject to any disclaimer, the term of this patent is extended or adjusted under 35 U.S.C. 154(b) by 177 days.

(21) Appl. No.: 16/891,272

(22) Filed: Jun. 3, 2020

(65) Prior Publication Data
US 2021/0059380 A1 Mar. 4, 2021

(30) Foreign Application Priority Data
Aug. 29, 2019 (TW) .................... 108131108

(51) Int. Cl.
| | |
|---|---|
| A45D 34/00 | (2006.01) |
| A45D 40/00 | (2006.01) |
| A45D 44/00 | (2006.01) |
| A45D 34/04 | (2006.01) |
| G06K 7/10 | (2006.01) |
| G06K 19/07 | (2006.01) |
| G06Q 10/08 | (2012.01) |
| B01F 27/92 | (2022.01) |
| B01F 27/806 | (2022.01) |
| B01F 27/808 | (2022.01) |
| B01F 27/1143 | (2022.01) |
| B01F 101/21 | (2022.01) |

(52) U.S. Cl.
CPC ............. *A45D 34/00* (2013.01); *A45D 34/04* (2013.01); *A45D 40/00* (2013.01); *A45D 44/005* (2013.01); *B01F 27/1143* (2022.01); *B01F 27/806* (2022.01); *B01F 27/808* (2022.01); *B01F 27/92* (2022.01); *G06K 7/10366* (2013.01); *G06K 19/0723* (2013.01); *G06Q 10/087* (2013.01); *A45D 2200/10* (2013.01); *B01F 2101/21* (2022.01)

(58) Field of Classification Search
CPC ...... A45D 34/00; A45D 34/04; A45D 44/005; A61K 2800/80; G06K 7/10366; G06K 19/0723; G06Q 10/087
See application file for complete search history.

(56) References Cited

U.S. PATENT DOCUMENTS

| | | | |
|---|---|---|---|
| 10,471,443 B2 * | 11/2019 | Chien | ................... B05B 7/2494 |
| 2017/0348982 A1 * | 12/2017 | Wong | ................... G06V 40/171 |

* cited by examiner

*Primary Examiner* — Jennifer C Chiang
(74) *Attorney, Agent, or Firm* — Tong J. Lee

(57) ABSTRACT

A makeup fluid management and supply device and method are provided. The method includes the steps of: receiving a cosmetic style template sent from a user device; selecting a makeup bottle by the control module in accordance with a makeup application step of the cosmetic style template and moving the makeup bottle to a using position by the driving module; reading a label information of the makeup bottle; sending the label information to the management unit so as to perform a validation procedure on the makeup bottle; rotating, in response to a positive validation result, the makeup bottle by the driving module so as to perform a makeup fluid mixing procedure on the makeup bottle; and driving, by the driving module, the makeup bottle to move in a first direction until the makeup bottle is squeezed so as to obtain a makeup fluid of the makeup bottle.

6 Claims, 14 Drawing Sheets

MAKEUP FLUID MANAGEMENT AND SUPPLY DEVICE AND METHOD

CROSS-REFERENCE TO RELATED APPLICATION

This application claims priority to, and the benefit of, TW Application Serial No. 108131108, filed on Aug. 29, 2019, which is incorporated by reference in its entirety.

BACKGROUND OF THE INVENTION

Field of the Invention

The present disclosure relates to makeup fluid management and supply devices and methods and, more particularly, to a makeup fluid management and supply device and method for an automatic makeup application machine.

Description of the Prior Art

It is human nature to want to be more beautiful, which explains why women are loyal consumers of makeup. A makeup fluid is a viscous suspension of complicated ingredients. After the makeup fluid has remained stationary for a while, the water and makeup powder separate. As a result, if a user does not stir the makeup fluid uniformly prior to makeup application, the makeup application will turn out to be unsatisfactory. Furthermore, because the makeup fluid is viscous, a residue of the makeup fluid is likely to remain at the makeup outlet of a makeup container, thereby leading to waste of some makeup materials. If a makeup application procedure entails the users applying makeup by themselves, the users can shake the makeup container and remove the residue of the makeup fluid from the makeup outlet. However, if the users use an automatic makeup application device, the users cannot remove any residue of the makeup fluid by hand. As a result, the automatic makeup application device is often clogged with makeup powder. The other drawbacks of the automatic makeup application device include uneven stirring of the makeup fluid, the resultant reduction in the efficacy of makeup application, insufficient ease of use, and waste of makeup materials. Therefore, improvements to conventional automatic makeup application devices are needed.

An automatic makeup application device sprays makeup fluid onto the user's face automatically. If the user handles the automatic makeup application device inappropriately, such as by opening the original makeup bottle or deliberately adding a non-original makeup fluid into the original makeup bottle, the makeup fluid will be denatured, thereby exposing the user to the risk of infections and allergies. In view of this, it is important to provide a novel makeup fluid management and supply device which ensures user safety and enhances ease of use.

SUMMARY OF THE INVENTION

It is an objective of the present disclosure to provide a makeup fluid management and supply device for an automatic makeup application machine.

Another objective of the present disclosure is to provide a makeup fluid management and supply method for an automatic makeup application machine.

In order to achieve the above objectives, the present disclosure provides a makeup fluid management and supply device which comprises a device body and a management unit. The device body is signally connected with a user device and the management unit. The device body comprises a base, a receiving case, a signal transmission module, a driving module, a control module and an RFID label reading-writing member. The receiving case receives a makeup bottle. The makeup bottle has an RFID label. The receiving case is movably connected to the base to allow the makeup bottle to have a using position relative to the base. The receiving case contains therein makeup bottles in different colors and a cleansing solution bottle. The receiving case is movably connected to the base by a rotating shaft. Owing to the rotation of the rotating shaft, desired makeup bottles or cleansing solution bottles can be selected and then squeezed by a press head to allow a makeup fluid or cleansing solution to flow into a holding chamber and then be obtained from a nozzle to spray the makeup fluid onto the user's face for the purpose of makeup application or clean the nozzle with cleansing solution. The signal transmission module receives a cosmetic style template sent from the user device. The control module is signally connected with the signal transmission module and the driving module. The control module selects the desired makeup bottle according to the makeup application steps of the cosmetic style template and controllably causes the driving module to move the makeup bottle to a using position. The RFID label reading-writing member is signally connected with the management unit and signal transmission module. The RFID label reading-writing member reads a label information of the RFID label and sends the label information to the management unit so as to perform a validation procedure on the makeup bottle. In response to a positive validation result, the driving module rotates the makeup bottle to perform the makeup fluid stirring procedure, and then the driving module drives the makeup bottle to move in the first direction until the makeup bottle is squeezed so as to obtain the makeup fluid of the makeup bottle.

The present disclosure further provides a makeup fluid management and supply method for the makeup fluid management and supply device, the makeup fluid management and supply device comprising a device body and a management unit, the device body comprising a control module and a driving module, the makeup fluid management and supply method comprising the steps of: receiving a cosmetic style template sent from a user device; selecting a desired makeup bottle by the control module in accordance with a makeup application step of the cosmetic style template and moving the makeup bottle to a using position by the driving module; reading a label information of the makeup bottle; sending the label information to the management unit so as to perform a validation procedure on the makeup bottle; rotating, in response to a positive validation result, the makeup bottle by the driving module so as to perform a makeup fluid stirring procedure on the makeup bottle and stir the makeup fluid evenly with the rotation of the makeup bottle and the assistance of a stirring rod; and driving, by the driving module, the makeup bottle to move in a first direction until the makeup bottle is squeezed so as to obtain a makeup fluid of the makeup bottle.

The makeup fluid management and supply device and method of the present disclosure are effective in overcoming drawbacks of the prior art: conventional devices are often clogged with makeup powder, and the stirring of the makeup fluid is uneven, to the detriment of the efficacy of makeup application. Furthermore, the validation procedure of the makeup fluid management and supply device and method of the present disclosure is effective in controlling the quality of the original makeup bottles to therefore ensure user safety and enhance ease of use, thereby solving the existing problems of the prior art.

DETAILED DESCRIPTION OF THE EMBODIMENTS

Technical features of the present disclosure are illustrated by preferred, specific embodiments and described below. FIG. 1 through FIG. 6 include a block diagram of a makeup fluid management and supply device according to an embodiment of the present disclosure, a schematic view of the makeup fluid management and supply device according to an embodiment of the present disclosure, an exploded view of the makeup fluid management and supply device according to an embodiment of the present disclosure, an exploded view of a makeup bottle and a receiving case according to the present disclosure, a cross-sectional view of the makeup bottle rotated to occupy a using position according to the present disclosure, and a cross-sectional view of how the makeup bottle undergoes stirring and squeezing according to an embodiment of the present disclosure.

Figure 1:
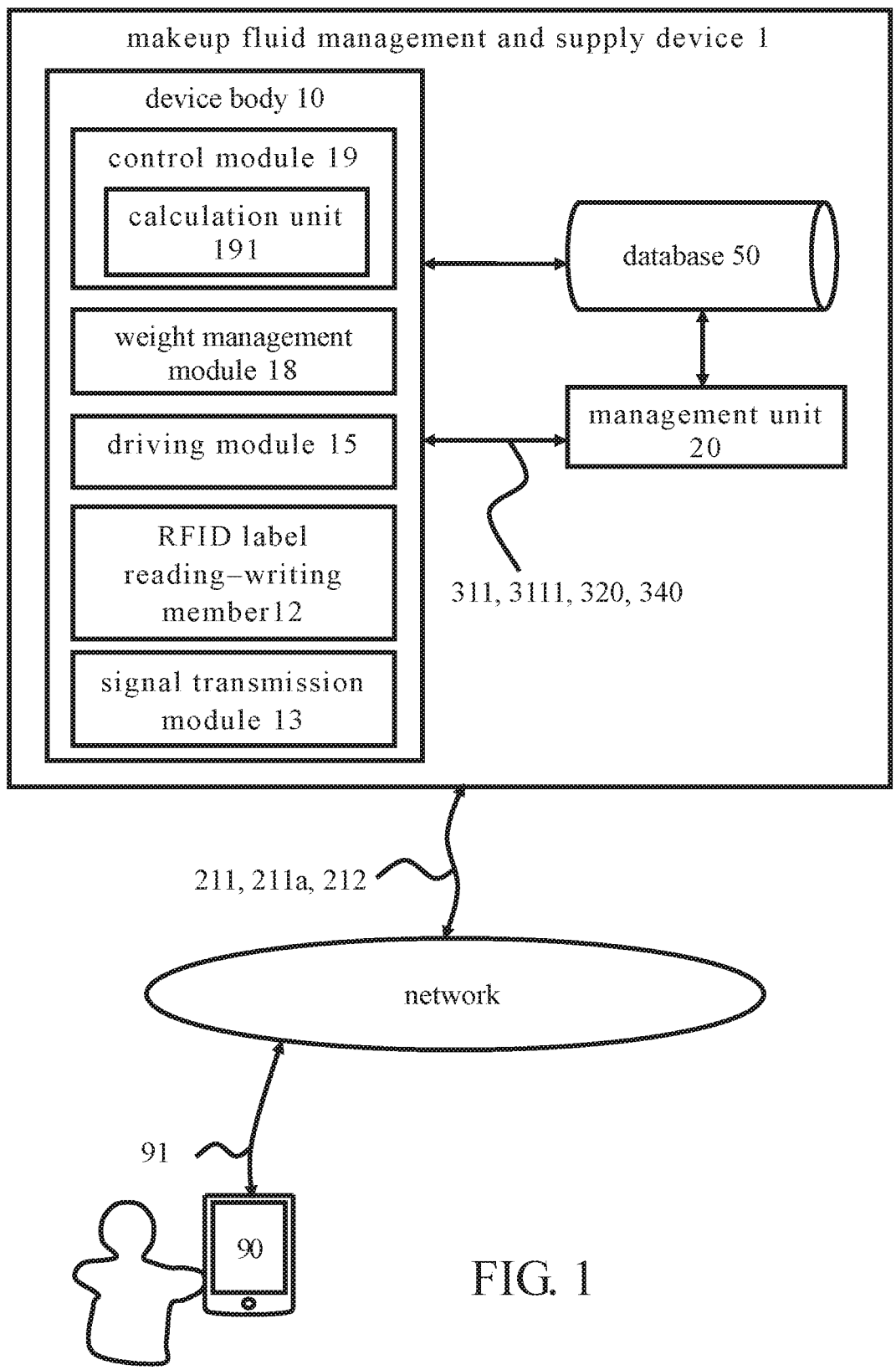
FIG. 1 is a block diagram of a makeup fluid management and supply device according to an embodiment of the present disclosure.
Figure 2:
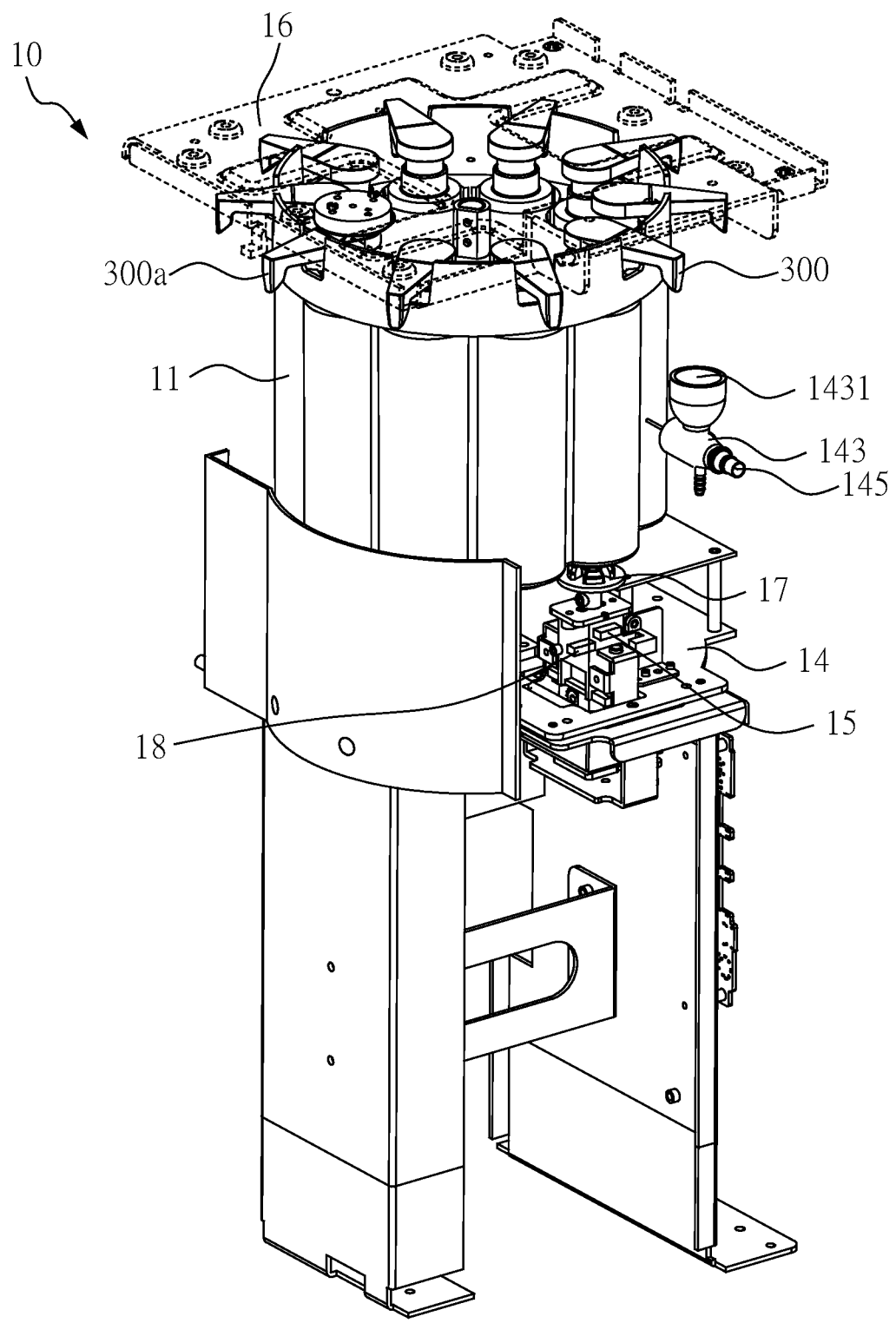
FIG. 2 is a schematic view of the makeup fluid management and supply device according to an embodiment of the present disclosure.
Figure 3:
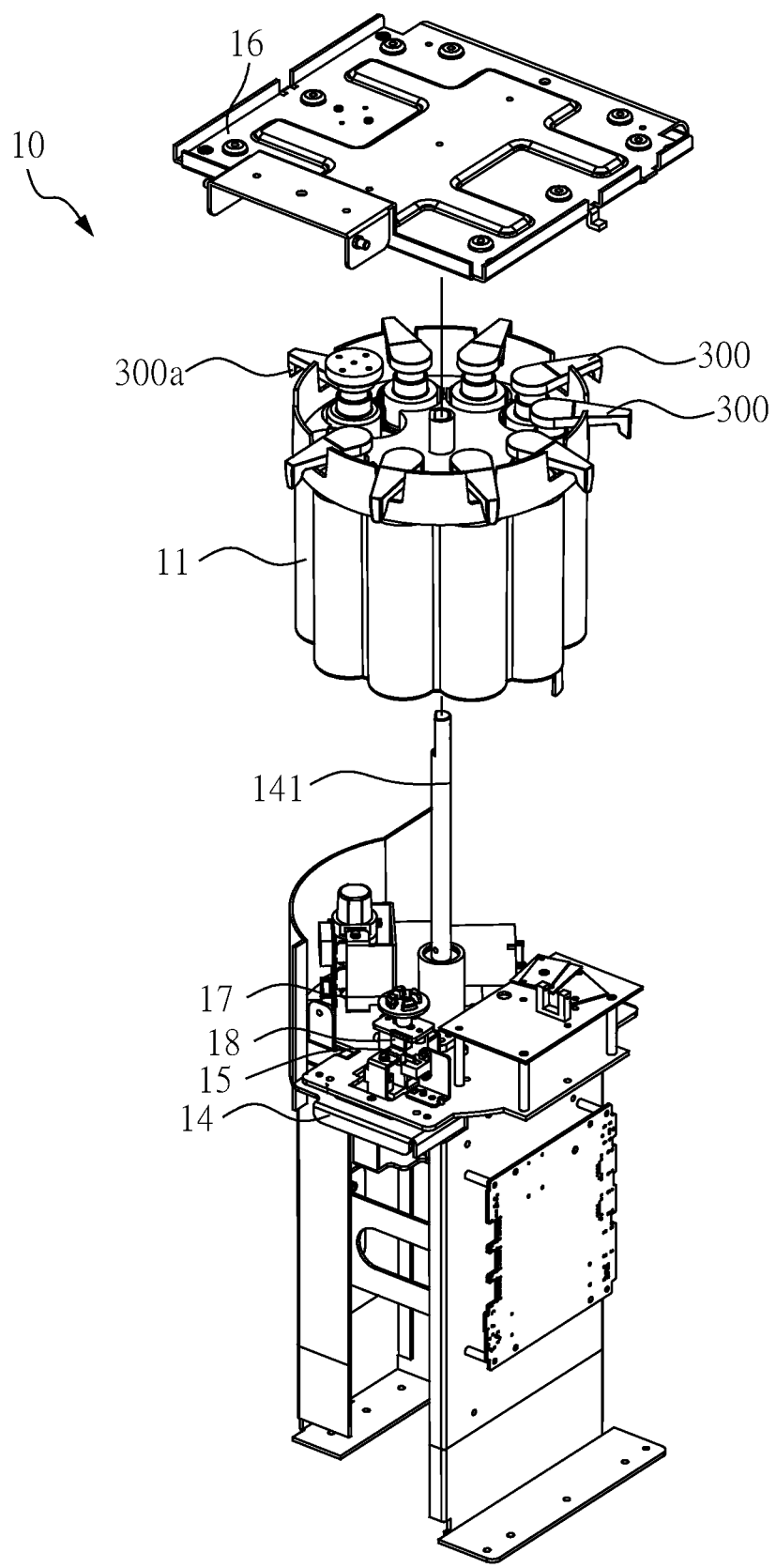
FIG. 3 is an exploded view of the makeup fluid management and supply device according to an embodiment of the present disclosure.

In the embodiment shown in FIG. 1 and FIG. 2, a makeup fluid management and supply device 1 of the present disclosure comprises a device body 10, a management unit 20 and a database 50. The device body 10 is signally connected with the management unit 20 and a user device 90. The management unit 20 is signally connected with the database 50. As shown in FIG. 1 through FIG. 3, the device body 10 comprises a receiving case 11, an RFID label reading-writing member 12, a signal transmission module 13, a base 14, a driving module 15, a cover 16, a port 17, a weight management module 18, a makeup fluid holding device 143 and a control module 19. The receiving case 11 is movably connected to the base 14 by a rotating shaft 141. The base 14 supports the RFID label reading-writing member 12, signal transmission module 13, driving module 15, port 17, weight management module 18, makeup fluid holding device 143 and control module 19. The receiving case 11 is disposed between the cover 16 and the base 14. A plurality of makeup bottles 300 and a cleansing solution bottle 300a are received in the receiving case 11. The cover 16 covers the makeup bottles 300 and the cleansing solution bottle 300a from above. The RFID label reading-writing member 12 is signally connected with the control module 19 and the signal transmission module 13. The driving module 15 is signally connected with the control module 19, port 17, weight management module 18 and makeup fluid holding device 143. The weight management module 18 is signally connected with the control module 19.

In a specific embodiment of the present disclosure, the makeup fluid management and supply device 1 are part of a makeup apparatus capable of automatic makeup application. The management unit 20 and the database 50 can be built-in components of the device body 10. In another specific embodiment of the present disclosure, the management unit 20 of the makeup fluid management and supply device 1 is a microprocessor disposed in a server of the developer of the makeup fluid management and supply device 1 together with the database 50. The device body 10 is signally connected with the management unit 20 and the database 50 by the signal transmission module 13 and via a network. In a specific embodiment of the present disclosure, the developer of the makeup fluid management and supply device 1 provides an application program which a user can download via the user device 90. The user then selects by the application program a cosmetic style of makeup application to be performed with the device body 10. In this embodiment, the user device 90 can be a smartphone, tablet, notebook computer, or desktop computer. It should be noted that the aforesaid modules may not only be implemented in the form of hardware devices, software programs, firmware or a combination thereof but also implemented as circuits or in any other appropriate forms. Furthermore, each of the modules may not only be self-contained but may also be coupled to each other. This embodiment only serves as exemplary purposes to illustrate the present disclosure. For the sake of brevity, possible variant embodiments are not herein described in detail. However, persons skilled in the art will understand not only that the aforesaid modules and/or components are not necessarily required but also that embodiments of the present disclosure may include any other conventional modules and/or components. The aforesaid modules and/or components may be omitted and/or modified as needed. Another module and/or component may be disposed between any two of the aforesaid modules.

Figure 4:
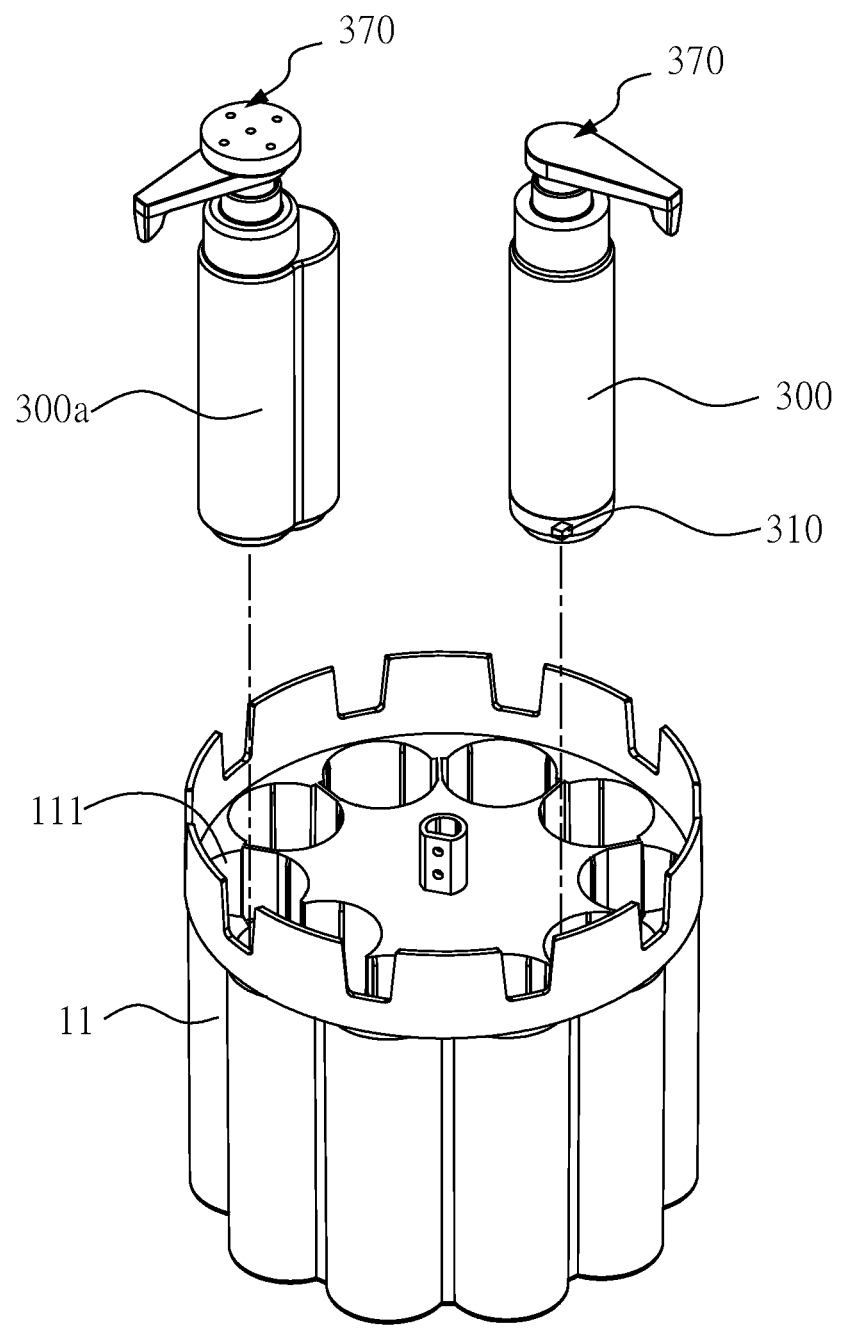
FIG. 4 is an exploded view of a makeup bottle and a receiving case according to the present disclosure.

As shown in this embodiment of FIG. 1, FIG. 2, and FIG. 4 through FIG. 6, the receiving case 11 comprises a plurality of makeup bottle reservoirs 111. The makeup bottles 300 and a cleansing solution bottle 300a are disposed in the makeup bottle reservoirs 111, respectively. Each makeup bottle 300 has an RFID label 310. The RFID label reading-writing member 12 reads a label information 311 of the RFID label 310. In a specific embodiment of the present disclosure, the label information 311 comprises a serial number information 3111 of each makeup bottle 300, a makeup fluid color number, remaining weight information related to the makeup bottle and generated upon termination of the preceding instance of usage, the dates of usage of the makeup bottle, and/or an expiry date of the makeup bottle. Besides, as shown in FIG. 2 through FIG. 4, in this embodiment, the receiving case 11 is cylindrical, is pivotally connected to the base 14 by the rotating shaft 141, and is driven by the driving module 15, thereby allowing each makeup bottle 300 to have a using position relative to the base 14. In a specific embodiment of the present disclosure, the driving module 15 comprises a first rotation unit for controlling the rotation of the receiving case 11 relative to the base 14. The first rotation unit is a rotating motor. In a specific embodiment of the present disclosure, the receiving case 11 carries a plurality of makeup bottles 300 containing different makeup liquid colors and a cleansing solution bottle 300a. The rotating shaft 141 rotates and thereby facilitates the user's selection of one of the makeup bottles 300 or the cleansing solution bottle 300a. Then the makeup retrieving unit 370 of the selected makeup bottle 300 or the selected cleansing solution bottle 300a is squeezed to allow the makeup fluid or cleansing solution to flow into the makeup fluid holding device 143 and to then be obtained from a nozzle 145 to spray the makeup fluid onto the user's face for the purpose of makeup application or clean the nozzle with the cleansing solution.

Figure 5:
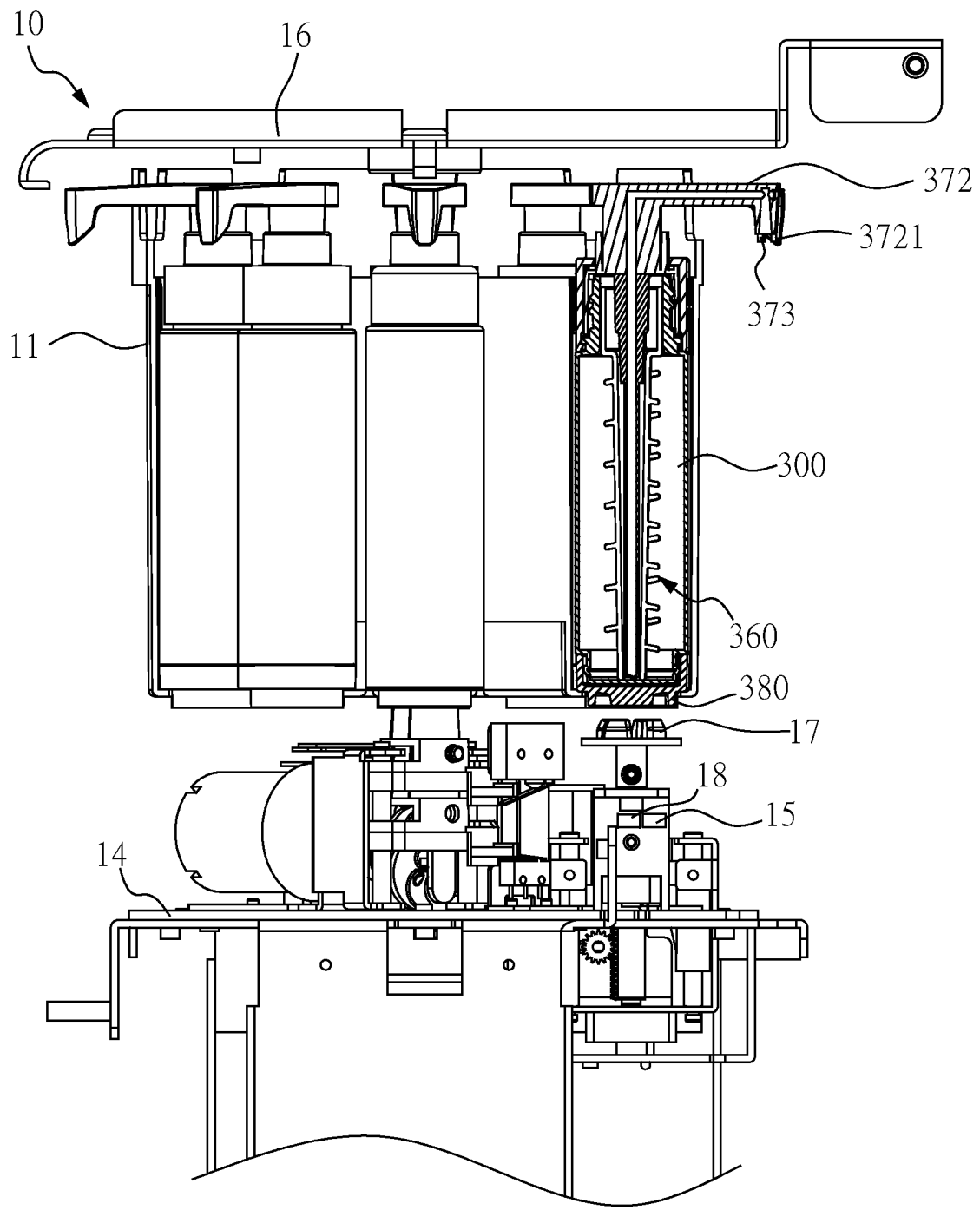
FIG. 5 is a cross-sectional view of the makeup bottle rotated to have a using position according to the present disclosure.
Figure 6:
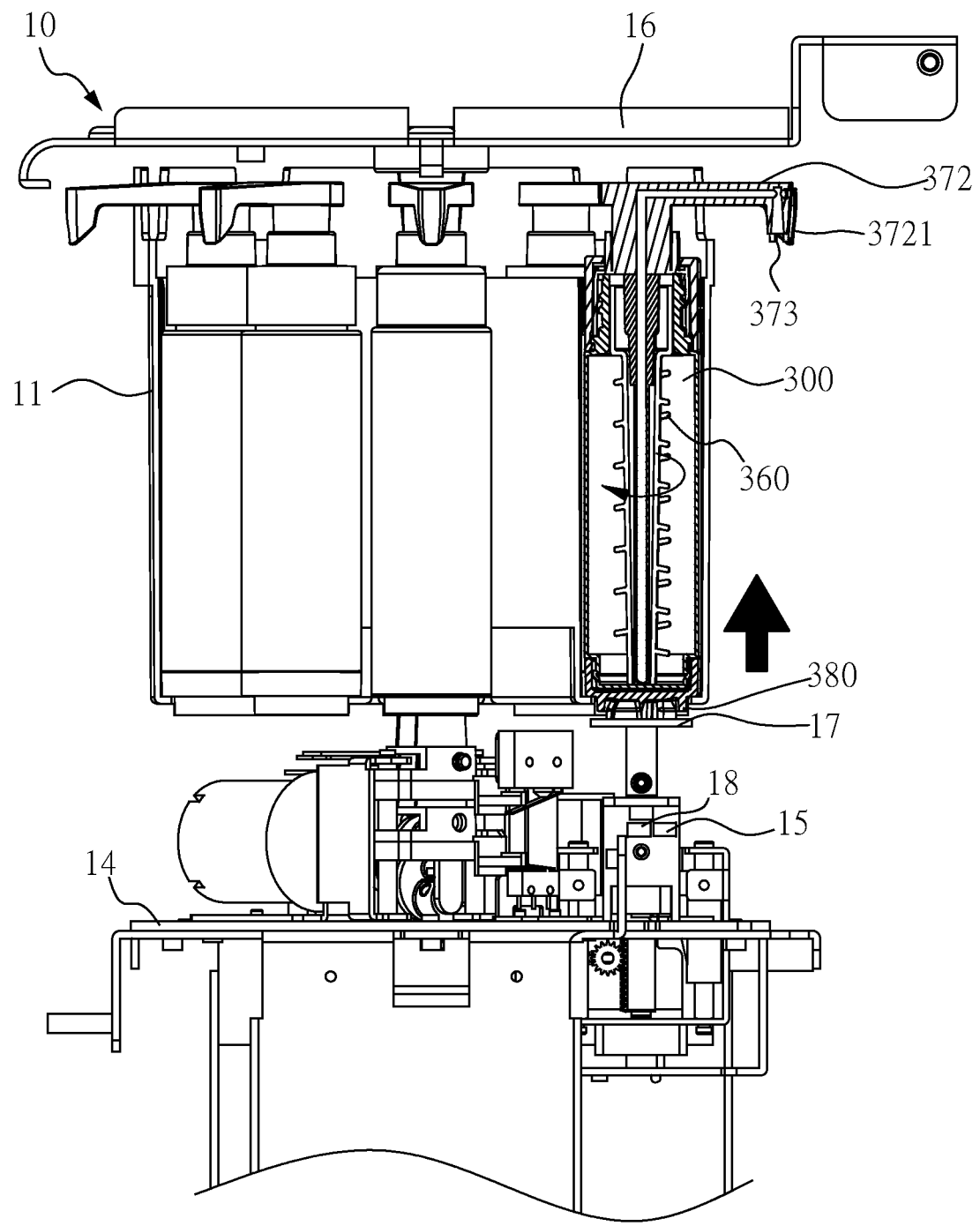
FIG. 6 is a cross-sectional view of how the makeup bottle undergoes stirring and squeezing according to an embodiment of the present disclosure.

As shown in FIG. 1 and FIG. 2, in this embodiment, the user uses the user device 90 to download an application program provided by the developer of the makeup fluid management and supply device 1, selects by the application program a cosmetic style template 91 for makeup application, and sends the cosmetic style template 91 to the signal transmission module 13 of the device body 10. In this embodiment, the control module 19 is a microprocessor and is signally connected with the signal transmission module 13 in order to receive the cosmetic style template 91. The control module 19 identifies, according to the cosmetic style template 91 built in the memory of the device body 10, a plurality of makeup application steps 911 generated by the cosmetic style template 91 and selects the desired makeup bottles 300 according to the makeup application steps 911. After that, the control module 19 drives the driving module 15 to rotate the receiving case 11, thereby moving a makeup bottle 300 to the using position relative to the base 14. In this embodiment, as shown in FIG. 5 and FIG. 6, the using position is the destination of the makeup bottle 300 above the weight management module 18 after the makeup bottle 300 has been rotated by the driving module 15.

As shown in FIG. 1, FIG. 4, FIG. 5 and FIG. 6, after the makeup bottles 300 have been rotated and moved to the using position relative to the base 14, the RFID label reading-writing member 12 reads the RFID label 310 to obtain the label information 311 and then sends the label information 311 to the management unit 20 by the signal transmission module 13, thereby allowing the management unit 20 to perform a validation procedure on the makeup bottles 300. In this embodiment, the validation procedure performed on the makeup bottles 300 comprises a serial number validation, and the label information 311 comprises a serial number information 3111. The management unit 20 receives the serial number information 3111 and searches the database 50 for the corresponding serial number information 3111. If the search result shows that the database 50 does not have the corresponding serial number information 3111, the management unit 20 will identify the current makeup bottle 300 as a counterfeit and send an alert information 211 to an application program of the user device 90 so as to inform the user that the makeup bottle 300 was not originally provided by the developer of the makeup fluid management and supply device 1 of the present disclosure. Under this condition, the current makeup bottle 300 will fail the validation procedure, and thus the makeup fluid management and supply device 1 of the present disclosure will not perform the makeup application steps generated by the cosmetic style template 91.

Through comparison, if the search result shows that the database 50 has the corresponding serial number information 3111, the current makeup bottle 300 passes the validation procedure. At this point, as shown in FIG. 1, FIG. 5 and FIG. 6, the driving module 15 rotates the makeup bottle 300 to perform a makeup fluid stirring procedure. In this embodiment, a first direction is the vertical direction, and the driving module 15 comprises a second rotation unit and a vertically moving unit. The vertically moving unit drives the port 17 to move in the first direction (vertical direction) until the port 17 is connected to the makeup bottle 300, and the second rotation unit rotates the port 17 to thereby drive the makeup bottle 300 to rotate so as to stir the makeup fluid. Upon completion of the makeup fluid stirring procedure, the driving module 15 drives the makeup bottle 300 to move in the first direction until the makeup bottle 300 is squeezed by the cover 16 such that the makeup fluid holding device 143 receives the makeup fluid. In this embodiment, the makeup fluid squeezed out of the makeup bottle 300 enters a holding chamber 1431 and is then obtained from the nozzle 145 such that the makeup fluid is sprayed onto the user's face for the purpose of makeup application. In a specific embodiment of the present disclosure, the second rotation unit is a rotating motor, and the vertically moving unit is a stepper motor or DC motor.

In a specific embodiment of the present disclosure, the validation procedure further comprises a weight validation. In this embodiment, before the weight validation starts, the vertically moving unit of the driving module 15 drives the port 17 to move in the first direction (vertical direction) until the port 17 is connected to the makeup bottle 300 to allow the weight management module 18 to obtain a current weight information 320 of the makeup bottle 300. Then the signal transmission module 13 sends the current weight information 320 to the management unit 20, and thus the management unit 20 determines whether the current weight information 320 matches an inventory remaining weight information 320a related to the makeup bottle 300 stored in the database 50. If the management unit 20 determines that the current weight information 320 related to the makeup bottle 300 and obtained by the weight management module 18 does not match the inventory remaining weight information 320a related to the makeup bottle 300 stored in the database 50, the management unit 20 will detect that other makeup fluid has been added into the current makeup bottle 300 in an unauthorized manner. At this point, the management unit 20 will send the alert information 211 to an application program of the user device 90 so as to inform the user that the makeup fluid management and supply device 1 of the present disclosure cannot make use of the makeup bottle 300. Under this condition, the current makeup bottle 300 fails the validation procedure, and thus the makeup fluid management and supply device 1 of the present disclosure will not perform the makeup application steps generated by the cosmetic style template 91. In this embodiment, the weight management module 18 is a load cell, but the present disclosure is not limited to this embodiment, and thus any other detector capable of measuring weight is also applicable to the present disclosure.

Through a comparison procedure, if the management unit 20 determines that the current weight information 320 related to the makeup bottle 300 and obtained by the weight management module 18 matches the inventory remaining weight information 320a related to the makeup bottle 300 stored in the database 50, the current makeup bottle 300 passes the validation procedure. At this point, as shown in FIG. 1, FIG. 5 and FIG. 6, the second rotation unit of the driving module 15 rotates the makeup bottle 300 to perform a makeup fluid stirring procedure. In this embodiment, the vertically moving unit causes the port 17 to connect to the makeup bottle 300. At this point, the makeup fluid can be stirred well, provided that the second rotation unit of the driving module 15 rotates the port 17 and thereby drives the makeup bottle 300 to rotate. Upon completion of the makeup fluid stirring procedure, the driving module 15 drives the makeup bottle 300 to move in the first direction until the makeup bottle 300 is squeezed by the cover 16 such that the makeup fluid holding device 143 receives the makeup fluid. If the current makeup bottle 300 passes the validation procedure but the current weight information 320 is less than a usage threshold, the management unit 20 will send a makeup bottle replacement signal 212 to the user device 90.

As shown in FIG. 1, FIG. 5 and FIG. 6, the control module 19 further comprises a calculation unit 191. After the makeup fluid holding device 143 has received the makeup fluid of the makeup bottle 300, the calculation unit 191 calculates the consumption amount of the makeup fluid in the makeup application steps in accordance with a squeeze count of the makeup bottle 300 and then calculates the remaining weight information 340 of the makeup fluid in accordance with the current weight information 320 and the consumption amount. For instance, the makeup fluid management and supply device 1 is an automatic makeup application system, and the force applied by the driving module 15 to drive the makeup bottle 300 to be squeezed by the cover 16 can be set to be constant. Consequently, the system developer of the makeup fluid management and supply device 1 of the present disclosure can predefine the relationship between the amount of the makeup fluid to be obtained from the makeup bottle 300 and the force applied between the makeup bottle 300 and the cover 16 and calculate the consumption amount of the makeup fluid in accordance with the squeeze count of the makeup bottle 300. For instance, the system developer of the makeup fluid management and supply device 1 of the present disclosure predefines the following: 0.5 gram of the makeup fluid is obtained from the makeup bottle 300 in each instance of the squeezing of the makeup bottle 300, and the makeup bottle 300 is squeezed twice in the makeup application step. Therefore, in the makeup application step, the consumption amount of the makeup fluid of the makeup bottle 300 is 1 gram (i.e., 2×0.5 gram). For example, if the current weight information 320 obtained by the weight management module 18 is 25 grams and the consumption amount in the makeup application step is 1 gram, the calculation unit 191 will calculate the remaining weight of the makeup fluid to be 24 grams (i.e., 25 grams-1 gram). Consequently, the remaining weight information 340 is 24 grams. Upon completion of the calculation process, the RFID label reading-writing member 12 writes the remaining weight information 340 to the RFID label 310, and the calculation unit 191 sends the remaining weight information 340 to the management unit 20. After that, the management unit 20 changes the inventory remaining weight information of the makeup bottle 300 from 25 grams to 24 grams (the inventory remaining weight information 320a) in accordance with the remaining weight information 340.

Figure 7:
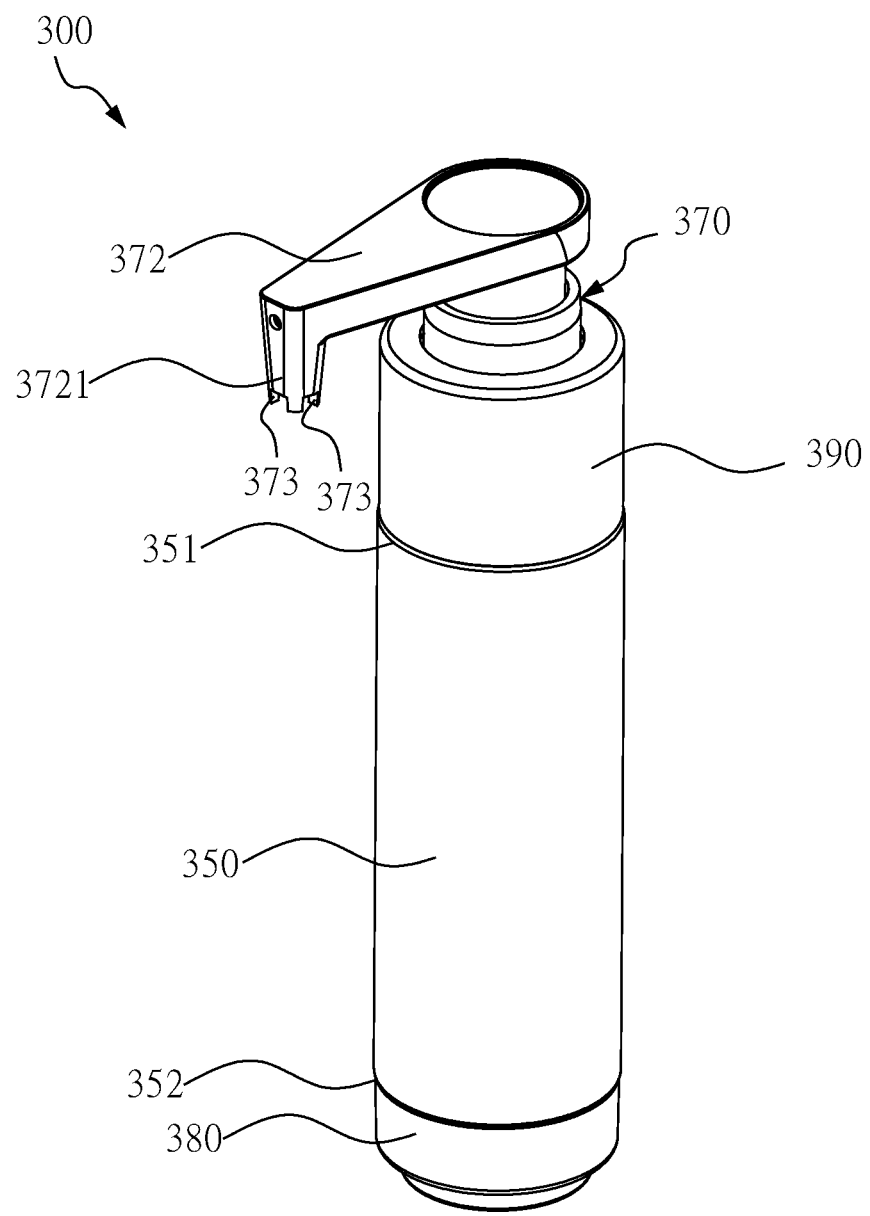
FIG. 7 is a schematic view of the makeup bottle according to an embodiment of the present disclosure.
Figure 8:
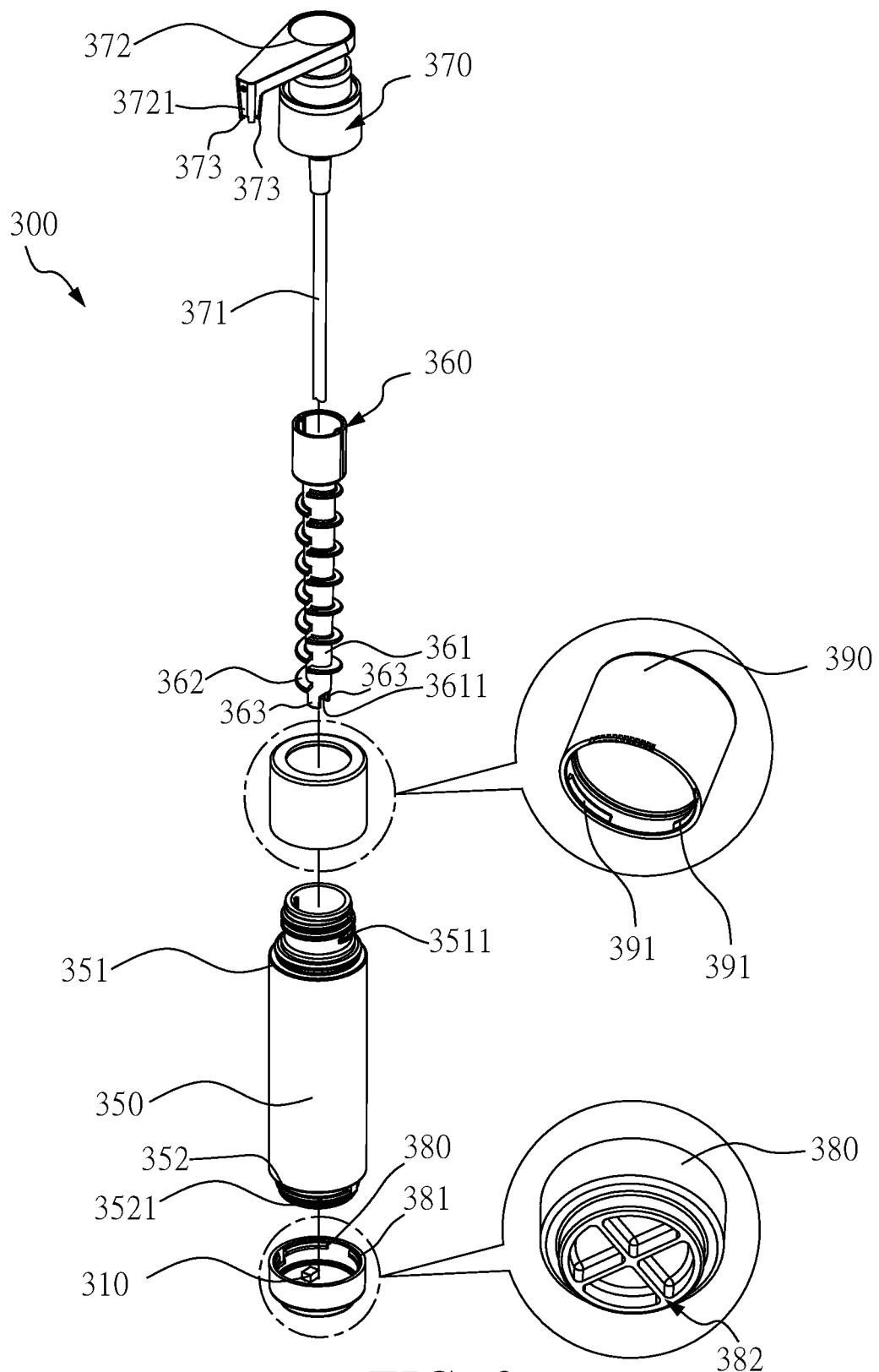
FIG. 8 is an exploded view of the makeup bottle according to an embodiment of the present disclosure.
Figure 9:
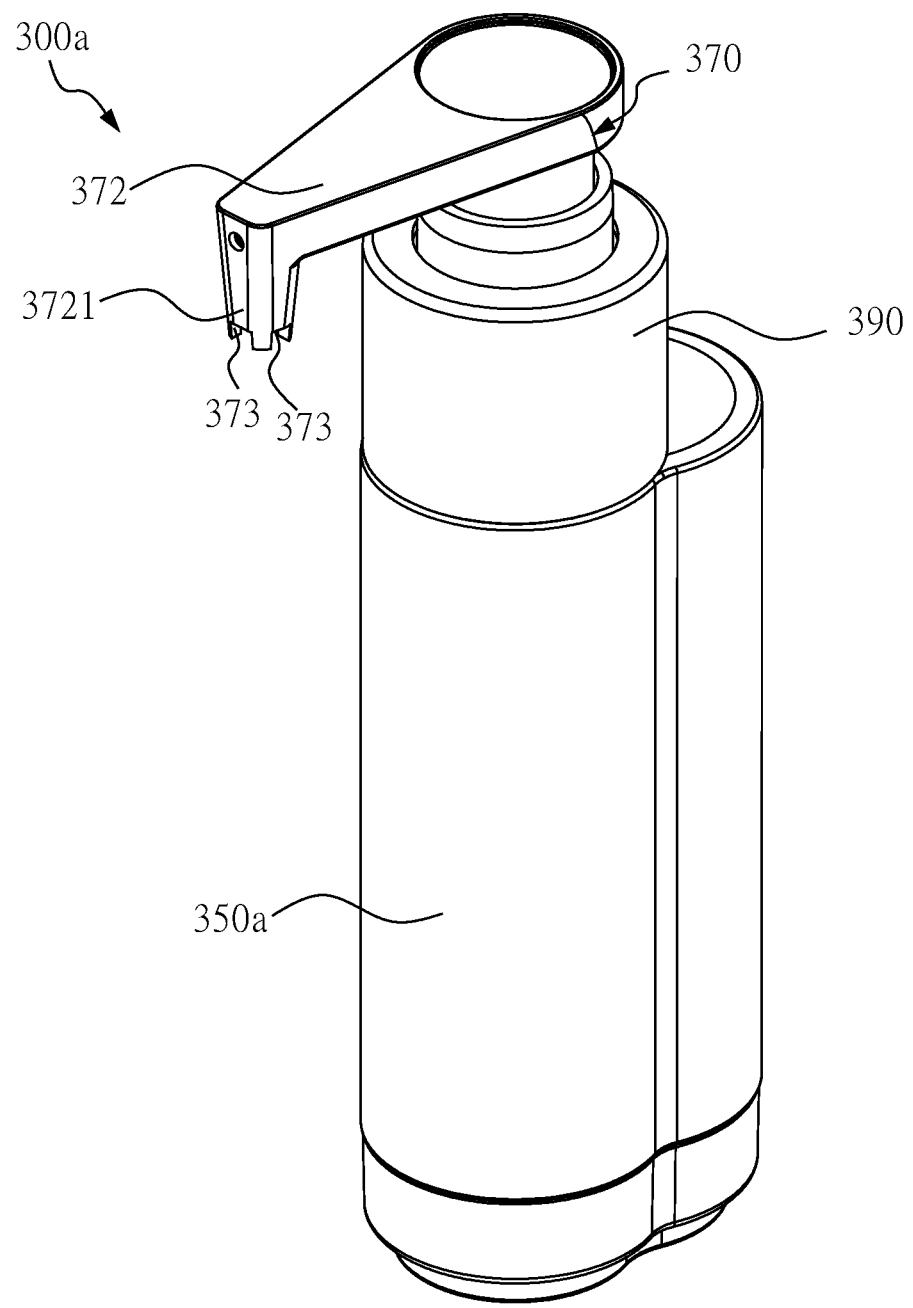
FIG. 9 is a schematic view of a cleansing solution bottle according to an embodiment of the present disclosure.
Figure 10:
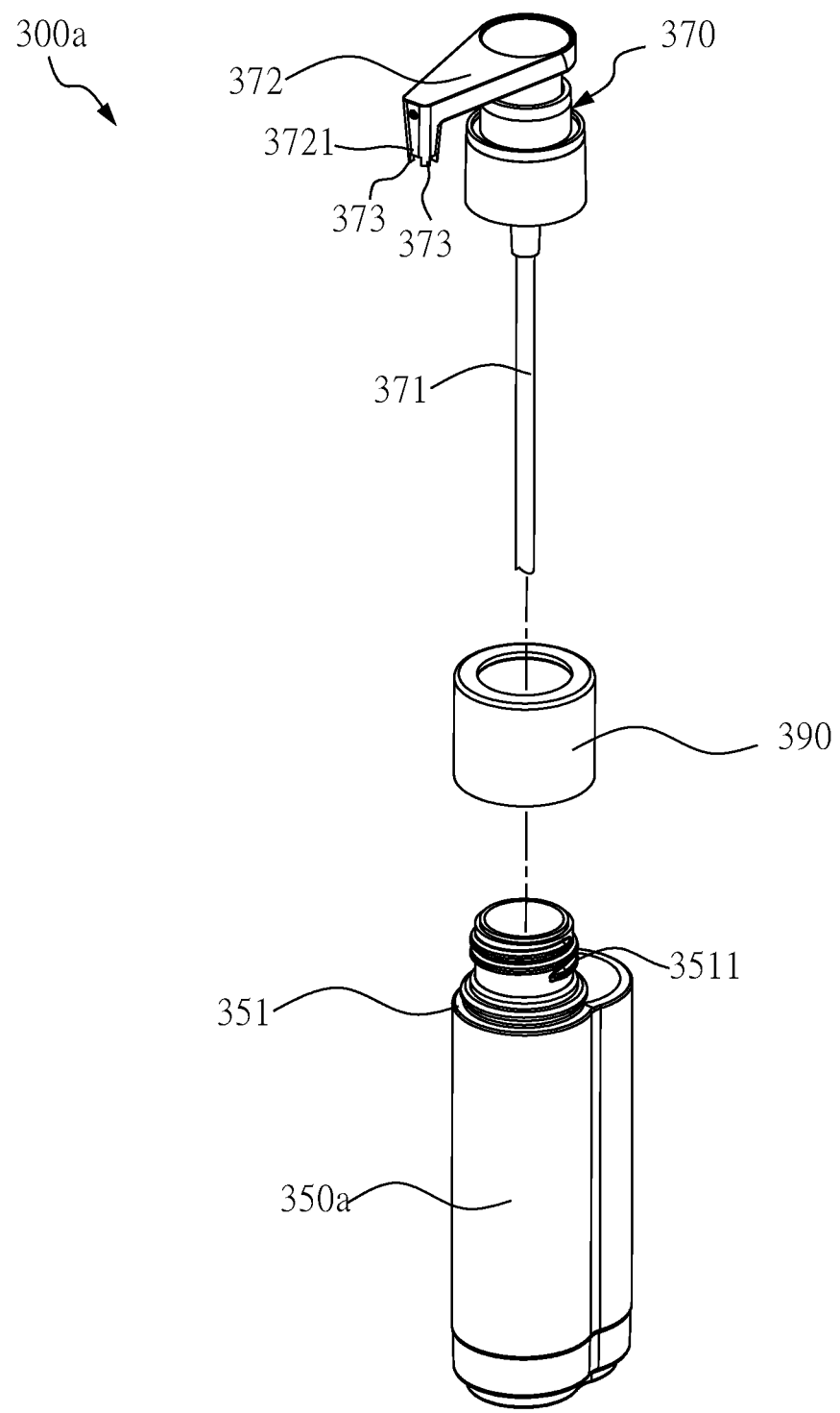
FIG. 10 is an exploded view of the cleansing solution bottle according to an embodiment of the present disclosure.

Referring to FIG. 1 through FIG. 6 together with FIG. 7 through FIG. 10, the present disclosure is further described in detail below. FIG. 7 is a schematic view of the makeup bottle according to an embodiment of the present disclosure. FIG. 8 is an exploded view of the makeup bottle according to an embodiment of the present disclosure. FIG. 9 is a schematic view of a cleansing solution bottle according to an embodiment of the present disclosure. FIG. 10 is an exploded view of the cleansing solution bottle according to an embodiment of the present disclosure.

As shown in FIG. 7 and FIG. 8, the makeup bottle 300 comprises a bottle body 350, a stirring rod 360, a makeup retrieving unit 370, a connecting element 380 and a sealing member 390. The RFID label 310 is disposed at the bottom of the bottle body 350. In this embodiment, the RFID label 310 is disposed between the connecting element 380 and the bottle body 350. The stirring rod 360 is disposed in the bottle body 350 and connected to the makeup retrieving unit 370. When the driving module 15 drives the makeup bottle 300 to perform the makeup fluid stirring procedure, the stirring rod 360 assists with the stirring of the makeup fluid. As shown in FIG. 8, the stirring rod 360 comprises a shaft 361, a helical blade 362 and two extending walls 363. The helical blade 362 extends from a top end of the shaft 361 to a bottom end 3611 of the shaft 361. The two extending walls 363 are each disposed at the bottom end 3611. The makeup fluid management and supply device 1 is an automatic makeup application system, and after the makeup fluid in the makeup bottle 300 has remained stationary for a while, the makeup fluid will separate into water and makeup powder. Thus, prior to each instance of automatic makeup application, the makeup fluid in the makeup bottle 300 has to be stirred evenly. When the driving module 15 drives the makeup bottle 300 to perform the makeup fluid stirring procedure, the helical blade 362 and the two extending walls 363 agitate the makeup fluid such that the makeup fluid is evenly stirred.

As shown in FIG. 8, the connecting element 380 comprises a plurality of engaging grooves 382, whereas the bottom portion 352 comprises a plurality of ribs 3521. The plurality of engaging grooves 382 are coupled to the plurality of ribs 3521, respectively, to prevent the user from demounting the connecting element 380 from the original makeup bottle 300 and mounting the connecting element 380 on a non-original makeup bottle in an unauthorized manner. Furthermore, to prevent the user from opening the makeup bottle 300 in an unauthorized manner, the makeup bottle 300 of the present disclosure comes with the sealing member 390 rotatably connected to a top portion 351 of the bottle body 350. The sealing member 390 comprises a plurality of engaging grooves 391. The top portion 351 comprises a plurality of ribs 3511. The plurality of engaging grooves 391 are coupled to the plurality of ribs 3511, respectively. These structural features enable the user to rotate the sealing member 390. However, the sealing member 390 can only rotate idly and thus cannot be separated from the bottle body 350, thereby preventing the user from opening the makeup bottle 300 and adding any non-original makeup fluid into the makeup bottle 300 in an unauthorized manner. Because the sealing member 390 is only able to rotate idly, the chance that the user will damage the mouth of the makeup bottle 300 is greatly reduced. The makeup retrieving unit 370 comprises a straw 371, a press head 372 and a groove 373. The press head 372 comprises a discharge end 3721. The groove 373 is disposed at the discharge end 3721 such that the makeup fluid can easily escape from the discharge end 3721, thereby overcoming a drawback of the prior art where makeup fluid is often accumulated in the discharge end 3721. In this embodiment, the groove 373 is U-shaped and the opening of the U-shape is at the discharge end 3721. The groove 373 is in the number of four to thereby optimize the escape of the makeup fluid. However, the present disclosure is not limited to this embodiment.

As shown in FIG. 4, FIG. 9 and FIG. 10, in the course of automatic makeup application, the consumption volume of the cleansing solution consumed is equal to about two times the capacity of the makeup bottle 300, and thus the capacity of a bottle body 350a of the cleansing solution bottle 300a is greater than the capacity of each makeup bottle 300. In this embodiment, the capacity of the bottle body 350a of the cleansing solution bottle 300a is equal to about two times the capacity of the bottle body 350 of each makeup bottle 300.

Figure 11:
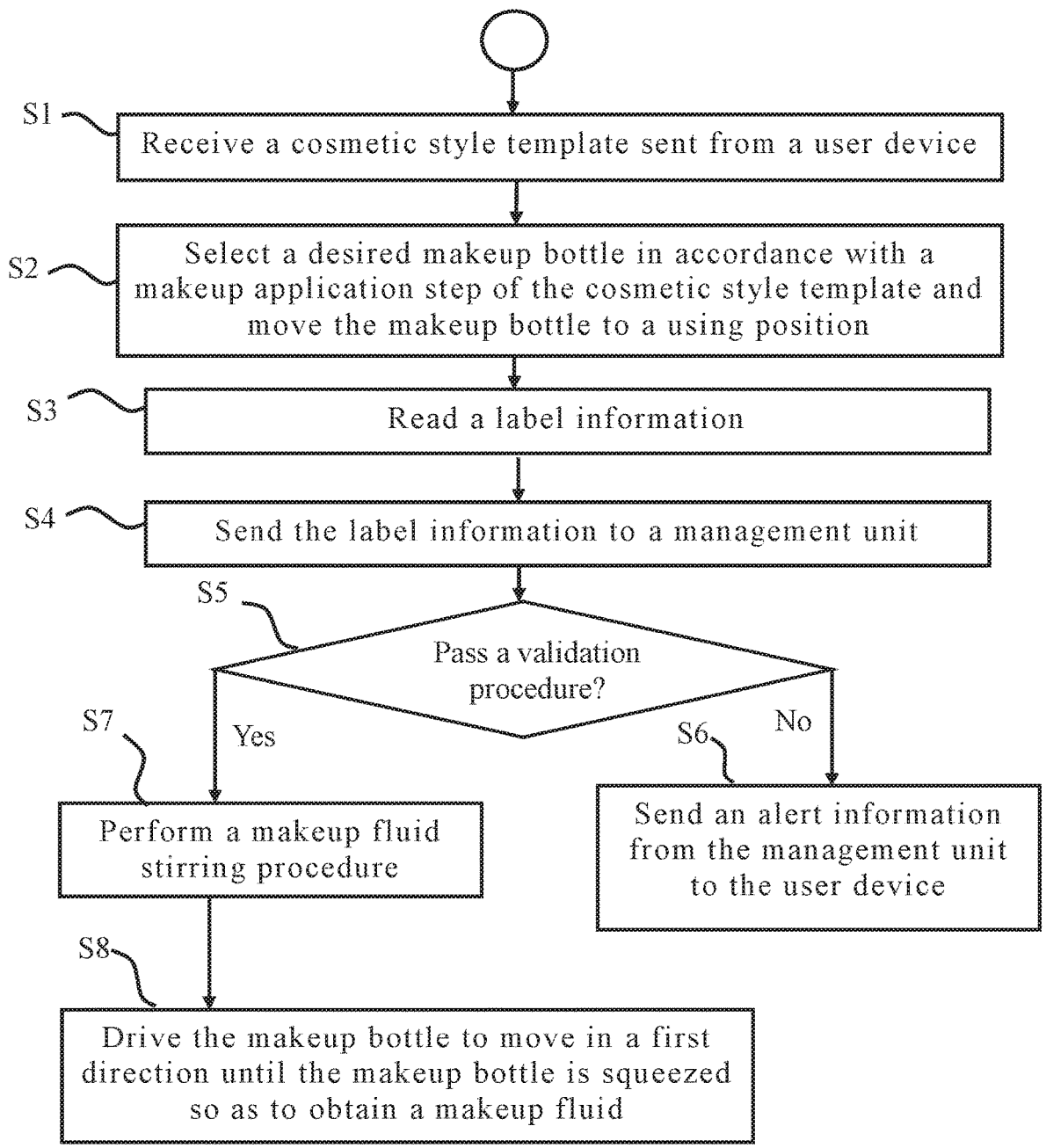
FIG. 11 is a flowchart of a makeup fluid management and supply method according to an embodiment of the present disclosure.

Referring to FIG. 11 together with FIG. 1 through FIG. 6, a makeup fluid management and supply method of the present disclosure is described below. FIG. 11 is a flowchart of a makeup fluid management and supply method according to an embodiment of the present disclosure. The makeup fluid management and supply method of the present disclosure is applicable to the makeup fluid management and supply device 1 of the present disclosure. As shown in FIG. 11, the makeup fluid management and supply method of the present disclosure essentially comprises step S1 through step S8. The steps of the makeup fluid management and supply method according to an embodiment of the present disclosure are described below.

Step S1: receiving a cosmetic style template sent from a user device.

As shown in FIG. 1 and FIG. 2, in this embodiment, the user downloads an application program provided by the developer of the makeup fluid management and supply device 1 with the user device 90, selects from the application program the cosmetic style template 91 for makeup application, and sends the cosmetic style template 91 to the signal transmission module 13 of the device body 10.

Step S2: selecting the desired makeup bottle in accordance with the makeup application step of the cosmetic style template and moving the makeup bottle to the using position.

As shown in FIG. 1 and FIG. 4 through FIG. 6, in this embodiment, the receiving case 11 comprises a plurality of makeup bottle reservoirs 111. The makeup bottles 300 and a cleansing solution bottle 300a are disposed in the makeup bottle reservoirs 111, respectively. Each makeup bottle 300 has an RFID label 310. The RFID label reading-writing member 12 reads the label information 311 of the RFID label 310. In this embodiment, the control module 19 is a microprocessor and is signally connected with the signal transmission module 13 in order to receive the cosmetic style template 91. The control module 19 identifies, according to the cosmetic style template 91 built in the memory of the device body 10, a plurality of makeup application steps 911 generated by the cosmetic style template 91 and selects the desired makeup bottles 300 according to the makeup application steps 911. After that, the control module 19 drives the driving module 15 to rotate the receiving case 11, thereby moving the makeup bottle 300 to the using position relative to the base 14. In this embodiment, as shown in FIG. 5 and FIG. 6, the using position is the destination of the makeup bottle 300 above the weight management module 18 after the makeup bottle 300 has been rotated by the driving module 15. In a specific embodiment of the present disclosure, the driving module 15 comprises a first rotation unit for controlling the receiving case 11 to rotate relative to the base 14 so as to select the desired makeup bottle 300 or the cleansing solution bottle 300a.

Step S3: reading a label information.

As shown in FIG. 1, FIG. 4, FIG. 5 and FIG. 6, after the makeup bottle 300 has been rotated to the using position of the base 14, the RFID label reading-writing member 12 reads the RFID label 310, obtains the label information 311, and sends the label information 311 to the management unit 20 through the signal transmission module 13 (step S4). In a specific embodiment of the present disclosure, the label information 311 comprises the serial number information 3111 of the makeup bottle 300, the makeup fluid color number, the remaining weight information related to the makeup bottle generated upon termination of the preceding instance of usage, the dates of usage of the makeup bottle, and/or the expiry date of the makeup bottle.

Step S5: performing validation.

After receiving the label information 311, the management unit 20 performs the validation procedure on the current makeup bottle 300 in accordance with the label information 311. In this step, the validation procedure entails comparing the label information 311 and data stored in the database 50 to determine whether they match. If the comparison result is negative, the management unit 20 will determine that the current makeup bottle 300 fails the validation procedure. At this point, it is necessary to perform step S6: the management unit 20 sends the alert information 211 to the user device 90. As a result, the makeup fluid management and supply device 1 of the present disclosure will not perform the makeup application steps generated by the cosmetic style template 91. If the comparison result is affirmative, the management unit 20 will determine that the current makeup bottle 300 passes the validation procedure. At this point, it is necessary to perform step S7: performing a makeup fluid stirring procedure.

Step S7: performing a makeup fluid stirring procedure.

As shown in FIG. 1, FIG. 5 and FIG. 6, the driving module 15 rotates the makeup bottle 300 to perform a makeup fluid stirring procedure. In this embodiment, the first direction is a vertical direction. The driving module 15 comprises a second rotation unit and a vertically moving unit. The vertically moving unit drives the port 17 to move in a first direction (vertical direction) until the port 17 is connected to the makeup bottle 300, and thus the second rotation unit rotates the port 17 to thereby drive the makeup bottle 300 to rotate so as to stir the makeup fluid.

Step S8: driving the makeup bottle to move in a first direction until the makeup bottle is squeezed so as to obtain the makeup fluid.

Upon completion of the makeup fluid stirring procedure, the driving module 15 drives the makeup bottle to move in a first direction until the makeup bottle 300 is squeezed by the cover 16 such that the makeup fluid holding device 143 receives the makeup fluid. In this embodiment, the makeup fluid squeezed out of the makeup bottle 300 enters the holding chamber 1431 and then is obtained from the nozzle 145, thereby allowing the makeup fluid to be sprayed onto the user's face for the purpose of makeup application.

Figure 12:
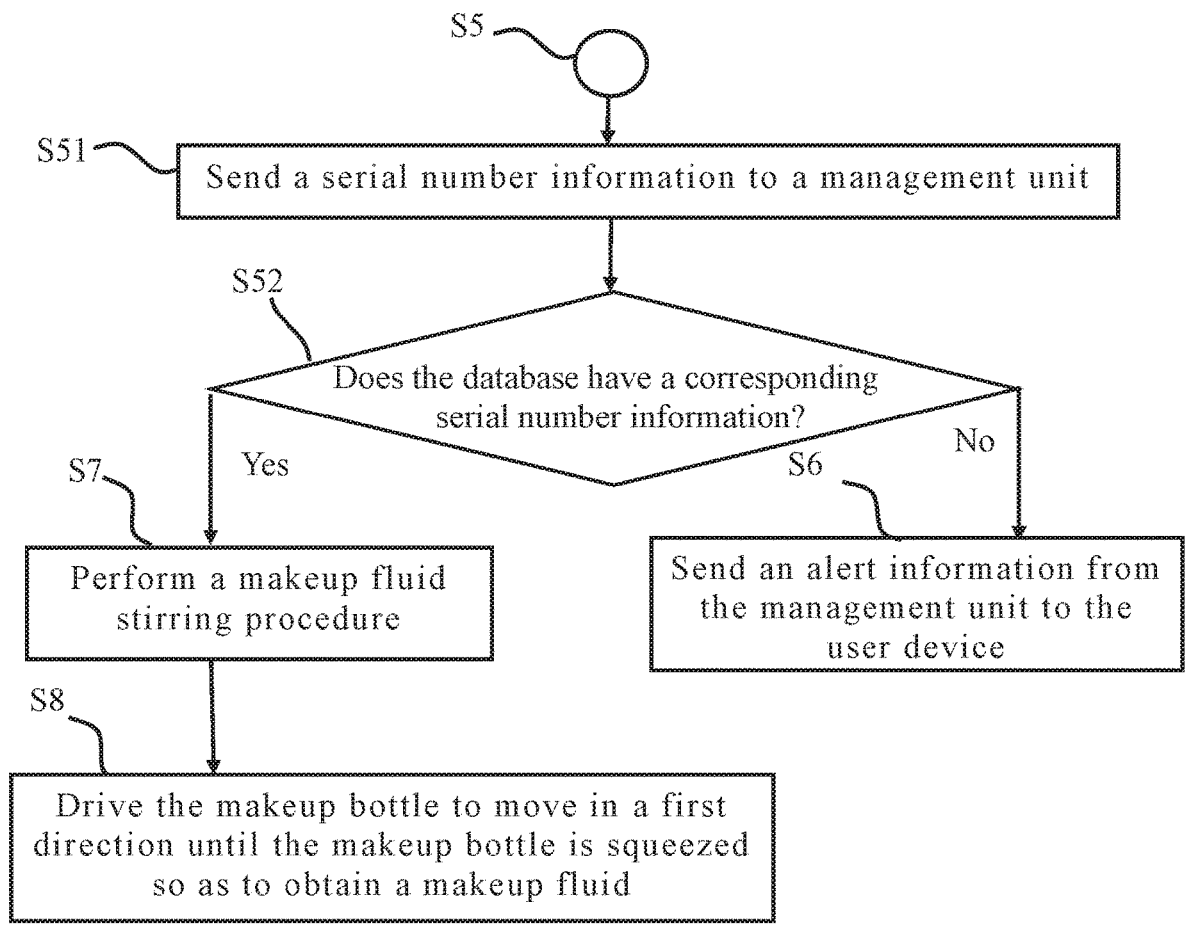
FIG. 12 is a flowchart of serial number validation according to an embodiment of the present disclosure.

Referring to FIG. 12 together with FIG. 1 through FIG. 6, FIG. 12 depicts a flowchart of serial number validation according to an embodiment of the present disclosure. In a specific embodiment of the present disclosure, the validation procedure comprises serial number validation. As shown in FIG. 12, the serial number validation of the present disclosure essentially comprises step S51 and step S52 as described below.

Step S51: sending a serial number information to the management unit.

The label information 311 read by the RFID label reading-writing member 12 comprises the serial number information 3111. The signal transmission module 13 sends the label information 311 to the management unit 20.

Step S52: determining whether the database contains the corresponding serial number information.

The management unit 20 receives the serial number information 3111 and searches the database 50 for the corresponding serial number information 3111. If the search result shows that the database 50 does not have the corresponding serial number information 3111, the management unit 20 will identify the current makeup bottle 300 as a counterfeit. At this point, it is necessary to perform step S6: the management unit 20 sends the alert information 211 to an application program of the user device 90 so as to inform the user that the makeup bottle 300 is not a makeup bottle 300 originally provided by the developer of the makeup fluid management and supply device 1 of the present disclosure. Under this condition, the current makeup bottle 300 fails the validation procedure, and thus the makeup fluid management and supply device 1 of the present disclosure will not perform the makeup application steps generated by the cosmetic style template 91.

If the search result shows that the database 50 has the corresponding serial number information 3111, it is determined that the current makeup bottle 300 passes the validation procedure. At this point, as shown in FIG. 1, FIG. 5 and FIG. 6, the driving module 15 rotates the makeup bottle 300 to perform a makeup fluid stirring procedure. In this embodiment, the first direction is a vertical direction. The driving module 15 comprises a rotation unit and a vertically moving unit. The vertically moving unit drives the port 17 to move in a first direction (vertical direction) until the port 17 is connected to the makeup bottle 300, and the rotation unit rotates the port 17 to thereby drive the makeup bottle 300 to rotate so as to stir the makeup fluid (step S7). Upon completion of the makeup fluid stirring procedure, the driving module 15 drives the makeup bottle to move in a first direction until the makeup bottle 300 is squeezed by the cover 16 such that the makeup fluid holding device 143 receives the makeup fluid. In this embodiment, the makeup fluid squeezed out of the makeup bottle 300 enters the holding chamber 1431 (step S8).

Figure 13:
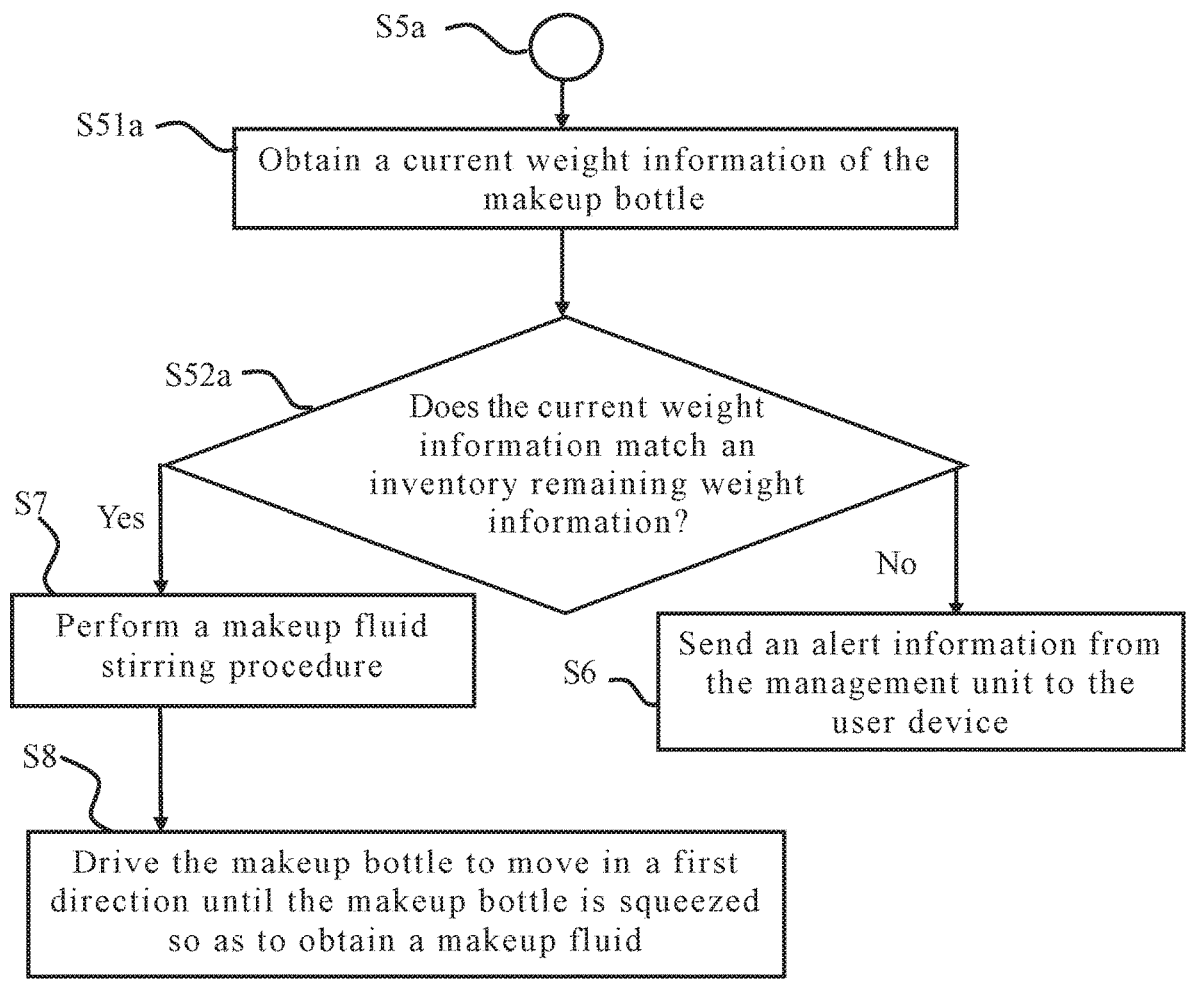
FIG. 13 is a flowchart of weight validation according to an embodiment of the present disclosure.

Referring to FIG. 13 together with FIG. 1 through FIG. 6, FIG. 13 shows a flowchart of weight validation according to an embodiment of the present disclosure. As shown in FIG. 13, weight validation of the present disclosure essentially comprises step S51a and step S52a as described below.

Step S51a: obtaining the current weight information of the makeup bottle.

In this embodiment, the vertically moving unit of the driving module 15 drives the port 17 to move in a first direction (vertical direction) until the port 17 is connected to the makeup bottle 300 such that the weight management module 18 can obtain a current weight information 320 of the makeup bottle 300. In this embodiment, the weight management module 18 is a load cell. After the weight management module 18 has obtained the current weight information 320 of the makeup bottle 300, the signal transmission module 13 sends the current weight information 320 to the management unit 20.

Step S52a: determining whether the current weight information matches the inventory remaining weight information.

The management unit 20 compares the current weight information 320 and the inventory remaining weight information 320a related to the makeup bottle 300 stored in the database 50 to determine whether they match. If the management unit 20 determines that the current weight information 320 related to the makeup bottle 300 and obtained by the weight management module 18 does not match the inventory remaining weight information 320a related to the makeup bottle 300 stored in the database 50, the management unit 20 will determine that other makeup fluid has been added into the current makeup bottle 300 in an unauthorized manner. At this point, the management unit 20 will send the alert information 211 to an application program of the user device 90 (step S6) so as to inform the user that the makeup fluid management and supply device 1 of the present disclosure cannot make use of the makeup bottle 300. Under this condition, the current makeup bottle 300 fails the validation procedure, and thus the makeup fluid management and supply device 1 of the present disclosure will not perform the makeup application steps generated by the cosmetic style template 91.

If the management unit 20 determines that the current weight information 320 related to the makeup bottle 300 and obtained by the weight management module 18 matches the inventory remaining weight information 320a related to the makeup bottle 300 stored in the database 50, the current makeup bottle 300 passes the validation procedure. At this point, as shown in FIG. 1, FIG. 5 and FIG. 6, the driving module 15 rotates the makeup bottle 300 and thus performs a makeup fluid stirring procedure (step S7). In this embodiment, the vertically moving unit drives the port 17 to connect to the makeup bottle 300. At this point, the makeup fluid can be stirred well, provided that the rotation unit rotates the port 17 and thus drives the makeup bottle 300 to rotate. Upon completion of the makeup fluid stirring procedure, the driving module 15 drives the makeup bottle to move in a first direction until the makeup bottle 300 is squeezed by the cover 16 such that the makeup fluid holding device 143 receives the makeup fluid (step S8). If the current makeup bottle 300 passes the validation procedure but the current weight information 320 is less than a usage threshold, the management unit 20 will send a makeup bottle replacement signal 212 to the user device 90.

Figure 14:
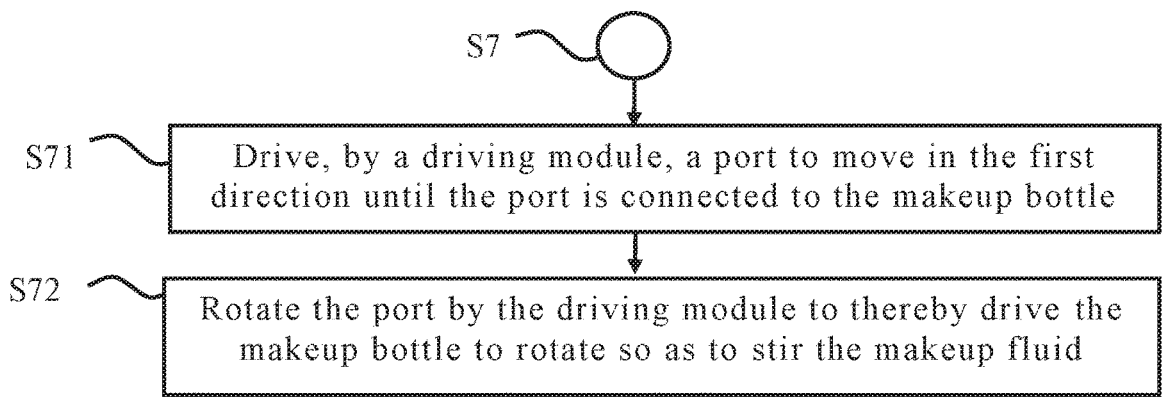
FIG. 14 is a flowchart of a makeup fluid stirring procedure according to an embodiment of the present disclosure.

Referring to FIG. 14 together with FIG. 1 through FIG. 6, FIG. 14 shows a flowchart of a makeup fluid stirring procedure according to an embodiment of the present disclosure. As shown in FIG. 14, the makeup fluid stirring procedure of the present disclosure essentially comprises step S71 and step S72 as described below.

Step S71: driving, by the driving module, the port to move in a first direction until the port is connected to the makeup bottle.

As shown in FIG. 1, FIG. 5 and FIG. 6, the driving module 15 rotates the makeup bottle 300 and thus performs a makeup fluid mixing procedure. In this embodiment, the first direction is a vertical direction. The driving module 15 comprises a second rotation unit and a vertically moving unit. The vertically moving unit drives the port 17 to move in a first direction (vertical direction) until the port 17 is connected to the makeup bottle 300, and the second rotation unit rotates the port 17 to thereby drive the makeup bottle 300 to rotate so as to stir the makeup fluid (step S72).

Figure 15:
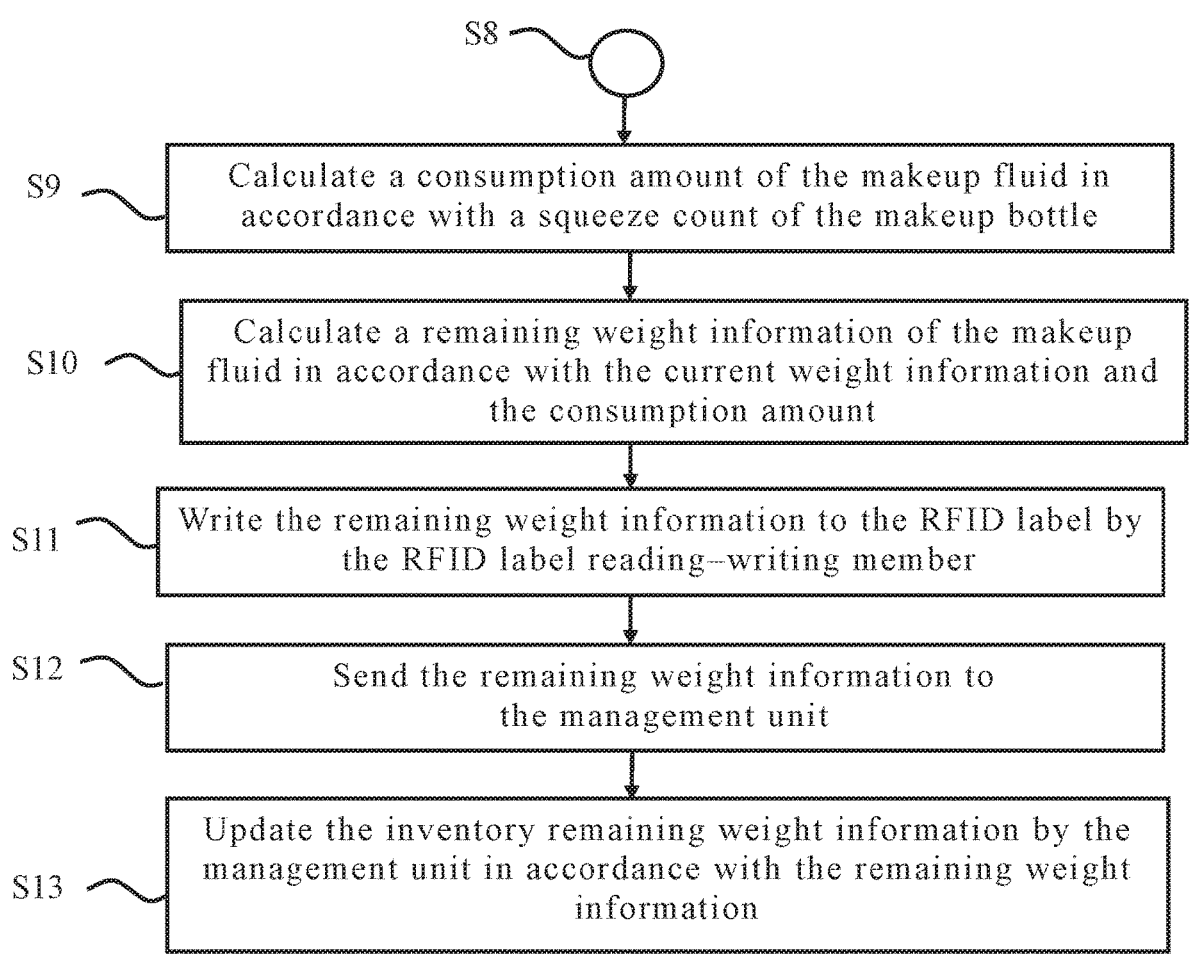
FIG. 15 is a flowchart of the makeup bottle remaining weight calculation according to an embodiment of the present disclosure.

Referring to FIG. 15 together with FIG. 1 through FIG. 6, FIG. 15 shows a flowchart of the makeup bottle remaining weight calculation according to an embodiment of the present disclosure. As shown in FIG. 15, the makeup bottle remaining weight calculation of the present disclosure essentially comprises step S9 through step S13 as described below.

Step S9: calculating the consumption amount of the makeup fluid in accordance with the squeeze count of the makeup bottle.

As shown in FIG. 1, FIG. 5 and FIG. 6, the control module 19 further comprises a calculation unit 191. After the makeup fluid holding device 143 has received the makeup fluid of the makeup bottle 300, the calculation unit 191 calculates the consumption amount of the makeup fluid in the makeup application steps in accordance with a squeeze count of the makeup bottle 300. For instance, the makeup fluid management and supply device 1 is an automatic makeup application system, and the force applied by the driving module 15 to drive the makeup bottle 300 being squeezed by the cover 16 can be set to be constant. Consequently, the system developer of the makeup fluid management and supply device 1 of the present disclosure can predefine the relationship between the amount of the makeup fluid to be obtained from the makeup bottle 300 and the force applied between the makeup bottle 300 and the cover 16 and calculate the consumption amount of the makeup fluid in accordance with the squeeze count of the makeup bottle 300. For instance, the system developer of the makeup fluid management and supply device 1 of the present disclosure predefines the following: 0.5 gram of the makeup fluid is obtained from the makeup bottle 300 in each instance of the squeezing of the makeup bottle 300, and the makeup bottle 300 is squeezed twice in the makeup application step. Therefore, in the makeup application step, the consumption amount of the makeup fluid of the makeup bottle 300 is 1 gram (i.e., 2×0.5 gram).

Step S10: calculating the remaining weight information of the makeup fluid in accordance with the current weight information and consumption amount.

For example, if the current weight information 320 obtained by the weight management module 18 is 25 grams and the consumption amount in the makeup application step is 1 gram, the calculation unit 191 will calculate the remaining weight of the makeup fluid to be 24 grams (i.e., 25 grams-1 gram). Consequently, the remaining weight information 340 is 24 grams. Upon completion of the calculation process, the RFID label reading-writing member 12 writes the remaining weight information 340 to the RFID label 310 (step S11), and the calculation unit 191 sends the remaining weight information 340 to the management unit 20 (step S12). After that, the management unit 20 changes the inventory remaining weight information of the makeup bottle 300 from 25 grams to 24 grams (the inventory remaining weight information 320a) in accordance with the remaining weight information 340 (step S13).

According to the present disclosure, the makeup fluid management and supply device 1 is advantageous in that the stirring rod 360 and the groove 373 disposed at the discharge end 3721 overcome drawbacks of the prior art as follows: conventional automatic makeup application devices are likely to be clogged with makeup powder, and their makeup fluid is stirred unevenly to the detriment of makeup application efficacy. According to the present disclosure, the makeup fluid management and supply device 1 and the validation procedure of the makeup fluid management and supply method are effective in controlling the quality of the makeup bottles originally provided so as to ensure user safety and enhance ease of use, thereby overcoming the drawbacks of the prior art.

The aforesaid embodiments serve solely illustrative purposes. The scope of the present invention must be defined by the appended claims of the present disclosure rather than restricted to the aforesaid embodiment.

What is claimed is:

1. A makeup fluid management and supply method for a makeup fluid management and supply device, the makeup fluid management and supply device comprising a device body and a management unit, the device body comprising a control module and a driving module, the makeup fluid management and supply method comprising the steps of:
   receiving a cosmetic style template sent from a user device;
   selecting a makeup bottle by the control module in accordance with a makeup application step of the cosmetic style template and moving the makeup bottle to a using position by the driving module;
   reading a label information of the makeup bottle;
   sending the label information to the management unit so as to perform a validation procedure on the makeup bottle;
   rotating, in response to a positive validation result, the makeup bottle by the driving module so as to perform a makeup fluid mixing procedure on the makeup bottle; and
   driving, by the driving module, the makeup bottle to move in a first direction until the makeup bottle is squeezed so as to obtain a makeup fluid of the makeup bottle.

2. The makeup fluid management and supply method of claim 1, wherein the validation procedure comprises a serial number validation, the makeup fluid management and supply device comprises a database, and the label information comprises a serial number information, the serial number validation further comprising the steps of:
   searching the database for a corresponding said serial number information;
   sending an alert information to the user device in response to a negative search result by the management unit; and
   performing the makeup fluid stirring procedure in response to a positive search result.

3. The makeup fluid management and supply method of claim 1, wherein the device body further comprises a port, and the makeup fluid stirring procedure further comprises the steps of:
   driving, by the driving module, the port to move in the first direction until the port is connected to the makeup bottle; and
   rotating the port by the driving module to drive the makeup bottle to rotate so as to stir the makeup fluid.

4. The makeup fluid management and supply method of claim 1, wherein the validation procedure comprises a weight validation, the makeup fluid management and supply device comprises a database, the device body comprises a weight management module, and the database stores an inventory remaining weight information of the makeup bottle, wherein the weight validation further comprises the steps of:
   obtaining a current weight information of the makeup bottle by the weight management module;
   comparing the current weight information and the inventory remaining weight information to determine whether they match;
   sending an alert information from the management unit to the user device in response to a negative comparison result; and
   performing the makeup fluid stirring procedure in response to a positive comparison result.

5. The makeup fluid management and supply method of claim 4, wherein the control module further comprises a calculation unit, and, after obtaining the makeup fluid of the makeup bottle, the makeup fluid management and supply method further comprises the steps of:
- calculating, by the calculation unit, a consumption amount of the makeup fluid in accordance with a squeeze count of the makeup bottle;
- calculating, by the calculation unit, a remaining weight information of the makeup fluid in accordance with the current weight information and the consumption amount;
- writing, by the RFID label reading-writing member, the remaining weight information to the RFID label;
- sending the remaining weight information to the management unit; and
- updating, by the management unit, the inventory remaining weight information in accordance with the remaining weight information.

6. The makeup fluid management and supply method of claim 4, wherein, if the current weight information is less than a usage threshold, the management unit sends a makeup bottle replacement signal to the user device.

* * * * *